Figure 1:
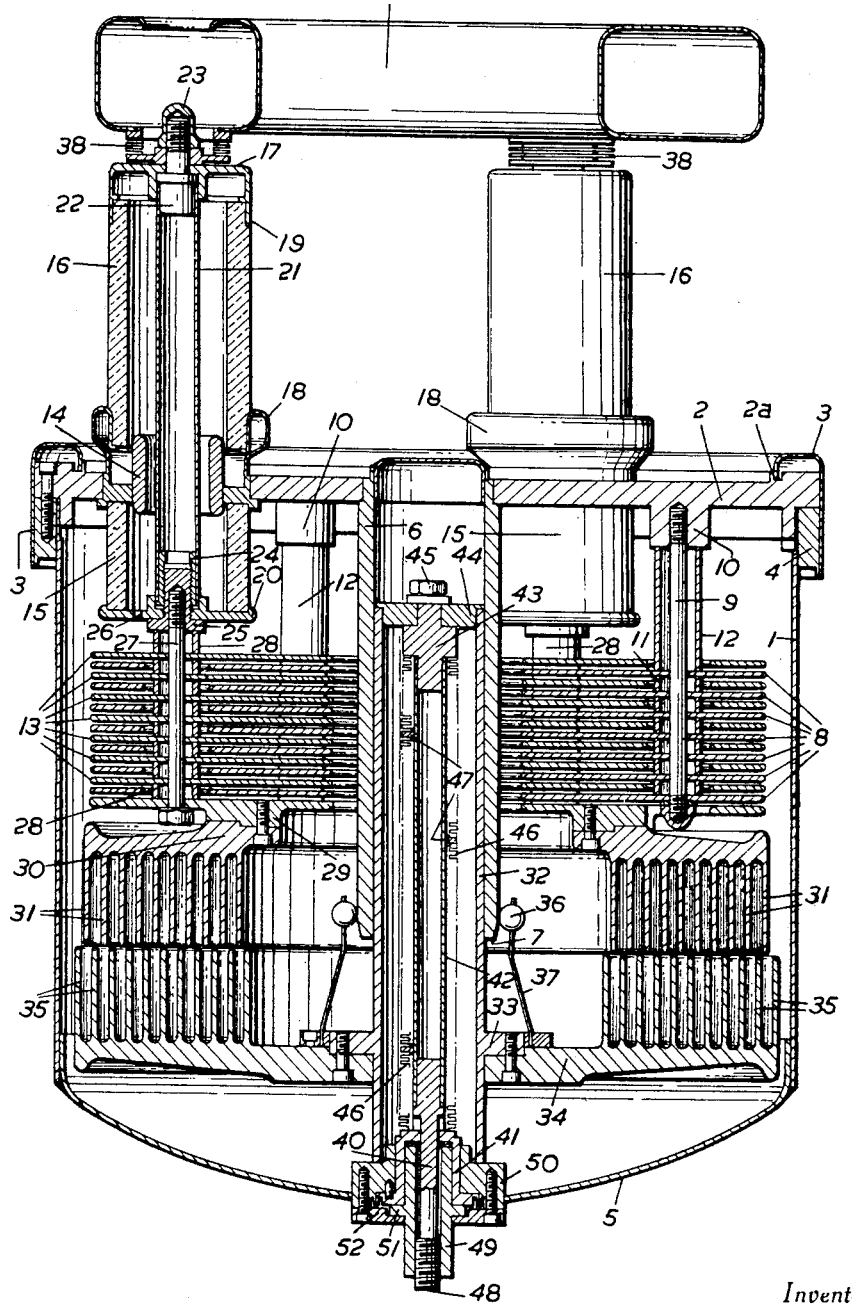

March 27, 1956  M. E. CLARKE ET AL  2,740,077
ELECTRICAL CONDENSERS

Filed Jan. 14, 1952  4 Sheets-Sheet 1

Inventor
Michael Edward Clarke
Leslie Harold Burton Knox
By
Emery Holcombe & Blair
Attorneys.

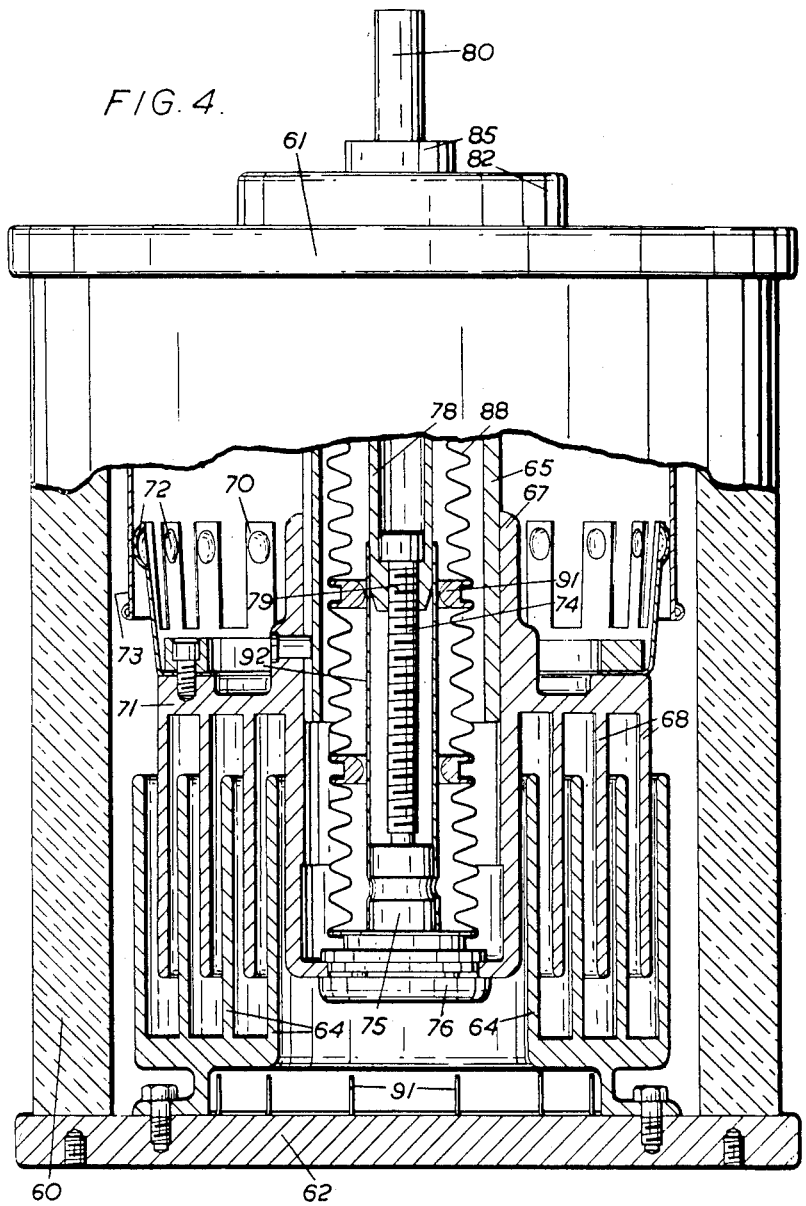

United States Patent Office 2,740,077
Patented Mar. 27, 1956

2,740,077

ELECTRICAL CONDENSERS

Michael Edward Clarke, Kew Gardens, and Leslie Harold Burton Knox, North Wembley, England, assignors to D. Napier & Son Limited, London, England, a company of Great Britain Application January 14, 1952, Serial No. 266,332

Claims priority, application Great Britain January 18, 1951

7 Claims. (Cl. 317—245)

This invention relates to electrical condensers of the kind in which the dielectric is constituted by a gas under a pressure which may be either above or below atmospheric pressure, such condensers being for convenience herein referred to as condensers of the gas filled type.

It is an object of the present invention to provide an improved form of condenser of the kind referred to which, while being of variable electrical capacity, will be of compact and adequately rigid construction and will be suitable for production in quantity, and where required in greater maximum capacities than previous condensers of the same kind. It is a further object of the invention to provide a condenser of this kind which is capable of being adjusted within fine limits, and which does not suffer from some of the disadvantages of previous condensers of this type.

It has already been proposed to use in a condenser cylindrical condenser plates which are relatively movable, and, for the purpose of maintaining a gas-tight seal between moving parts, bellows type sealing members have been employed.

According to the present invention a variable capacity electrical condenser of the gas-filled type comprises a gas-tight casing within which are mounted a set of fixed condenser plates in the form of a series of concentric cylinders, a set of movable condenser plates also in the form of a series of concentric cylinders coaxial with the fixed plates and of such diameters as to be capable of lying in the annular spaces between the fixed plates, a fixed cylindrical tubular supporting member rigidly secured to one end wall of the casing, a cylindrical plate carrying member carrying the movable plates and supported by the tubular supporting member in a manner permitting it to move axially thereon, to vary the overlap between the fixed and movable concentric plates and thus vary the capacity of the condenser, operating mechanism extending from outside the casing into the tubular supporting member and including an axially movable operating member connected to the plate carrying members, and a bellows type sealing member lying within the tubular supporting member and surrounding the operating member with its ends connected in a gas-tight manner respectively to the plate carrying member and to the casing.

Thus it will be seen that in condensers according to the invention the bellows type sealing member is partly if not wholly enclosed within the tubular supporting member, and may conveniently be of a comparatively great undistorted length, thereby tending to reduce failure of the bellows owing to fatigue. Moreover the construction may conveniently be arranged to ensure that the bellows does not itself carry the high frequency electrical currents. The gas usually at present used in such condensers is nitrogen which is maintained at a pressure of about 200 lbs. per square inch and in practice the maximum capacity for which condensers of this kind can be built conveniently is limited by the minimum spacing of the plates permitted by the dielectric strength of the compressed gas and the fact that this minimum spacing is governed by the pressure of the gas and the higher the gas pressure, the smaller must be the casing of the condenser for given stresses on the casing and the more difficult does it become to maintain the gas pressure.

Recently it has been proposed to use sulphur hexafluoride as the dielectric gas in a condenser of the type in question and it is found that this gas at a pressure of between 30 and 40 lbs. per square inch has a dielectric strength of between two and three times that of nitrogen at 200 lbs. per square inch.

Sulphur hexafluoride is therefore preferably though not necessarily used as the gas dielectric in condensers according to the invention.

In one construction according to the invention the casing comprises a cylindrical side wall of insulating material, an end wall of conducting material secured in a gas-tight manner to one end of the cylindrical side wall and supporting the set of fixed condenser plates, and a second end wall of conducting material secured in a gas-tight manner to the other end of the cylindrical side wall the tubular supporting member being secured to the second end wall, while the operating mechanism passes through an aperture in the second end wall into the tubular supporting member.

The plate carrying member may also be of tubular form and may surround the fixed tubular supporting member.

In such case, and in order to reduce the overall dimensions of the condenser, the plate-carrying member is preferably coaxial with the movable condenser plates, and extends into the cylindrical space enclosed by the innermost of the movable condenser plates, while the movable plates may be secured to the plate-carrying member at a point in its length spaced from the end adjacent the fixed plates.

Preferably sliding electrical contacts are included between the plate-carrying member and a part secured to the casing and connected to one of the terminals of the condenser.

Where it is desired to provide a relatively large capacity condenser with a relatively small range of variation of capacity, the condenser may include a series of disc-type condenser plates of fixed capacity arranged electrically in parallel with the cylindrical-type plates, and mounted within the same casing.

In another form according to the invention a variable capacity electrical condenser comprises a gas-tight casing of conducting material, a set of fixed condenser plates in the form of a series of concentric cylinders lying within the casing and supported by one or more conducting pillars which are insulated from the casing by tubular insulating members surrounding the pillars and spaced therefrom and extending outside the casing, the tubular members being sealed to the adjacent parts of the casing by gas-tight joints, and being closed at their outer ends by gas-tight end caps to which the outer ends of the pillars are secured while the inner ends of the tubular members are in open communication with the gas-filled interior of the casing, and including external terminals by which the condenser may be connected into its circuit connected to the pillars where they are secured to the end caps, a set of movable condenser plates also in the form of a series of concentric cylinders coaxial with the fixed plates and of such diameters as to be capable of lying in the annular spaces between the fixed plates, a fixed cylindrical tubular supporting member rigidly secured to one end wall of the casing, a cylindrical plate carrying member carrying the movable plates and supported by the tubular supporting member in a manner permitting it to move axially thereon, to vary the overlap between the fixed and movable concentric plates and thus vary the capacity of the condenser, operating mechanism extending from outside the casing into the tubular supporting member and including an axially movable operating member connected to the plate carrying member, and a bellows-type sealing member lying within the tubular supporting member and surrounding the operating member with its ends connected in a gas-tight manner respectively to the plate carrying member and to the casing.

In this case each conducting pillar preferably projects through an aperture in an adjacent wall of the casing and is insulated and supported therefrom by an insulating assembly comprising a relatively long tubular insulating member extending outside the casing and surrounding the outer part of the pillar which lies outside the casing, the inner end of this tubular insulating member being united to the casing in a gas-tight manner while its outer end is closed by an end cap to which the end of the pillar is secured, and which constitutes or is connected to an external terminal, and a relatively short tubular insulating member arranged within the casing and coaxial with the relatively long tubular insulating member, one end of the relatively short tubular insulating member bearing against the wall of the casing while its other end is acted upon by an abutment which is secured to the inner end of the conducting pillar in such a manner that the two tubular insulating members are clamped to opposite sides of the part of the wall of the casing between them by the part of the conducting pillar extending between the end cap and the abutment, with the interior of the chamber enclosed by the tubular insulating members in open communication with the interior of the casing.

Preferably the bellows type sealing member between the operating member and the casing comprises a tubular bellows surrounding a part of the operating member which lies within the casing, and including one or more relatively rigid tubular locating elements secured to the bellows at intermediate points in its length and making a sliding fit with the operating member so as to tend to maintain the bellows concentric with the operating member.

Figure 2:
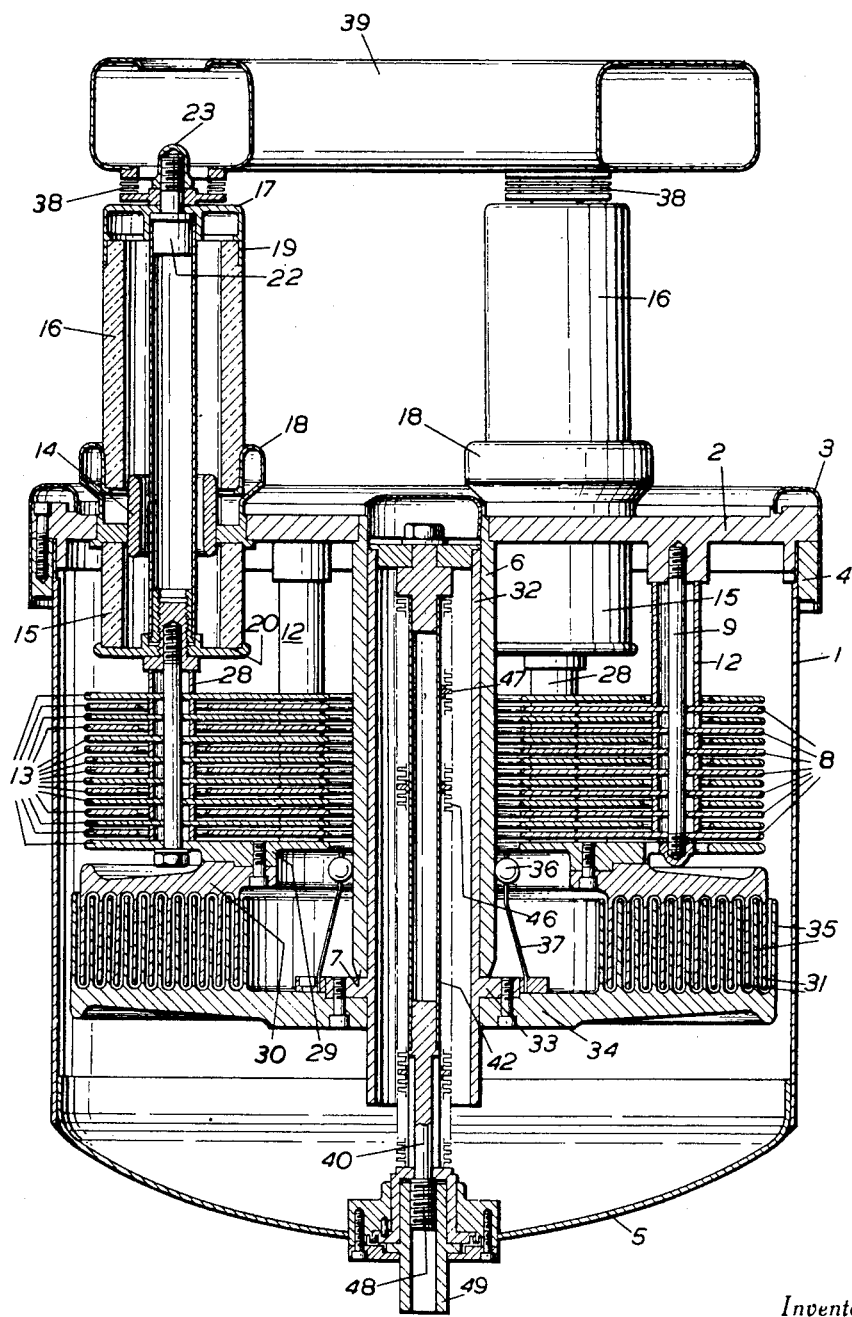
Figure 3:
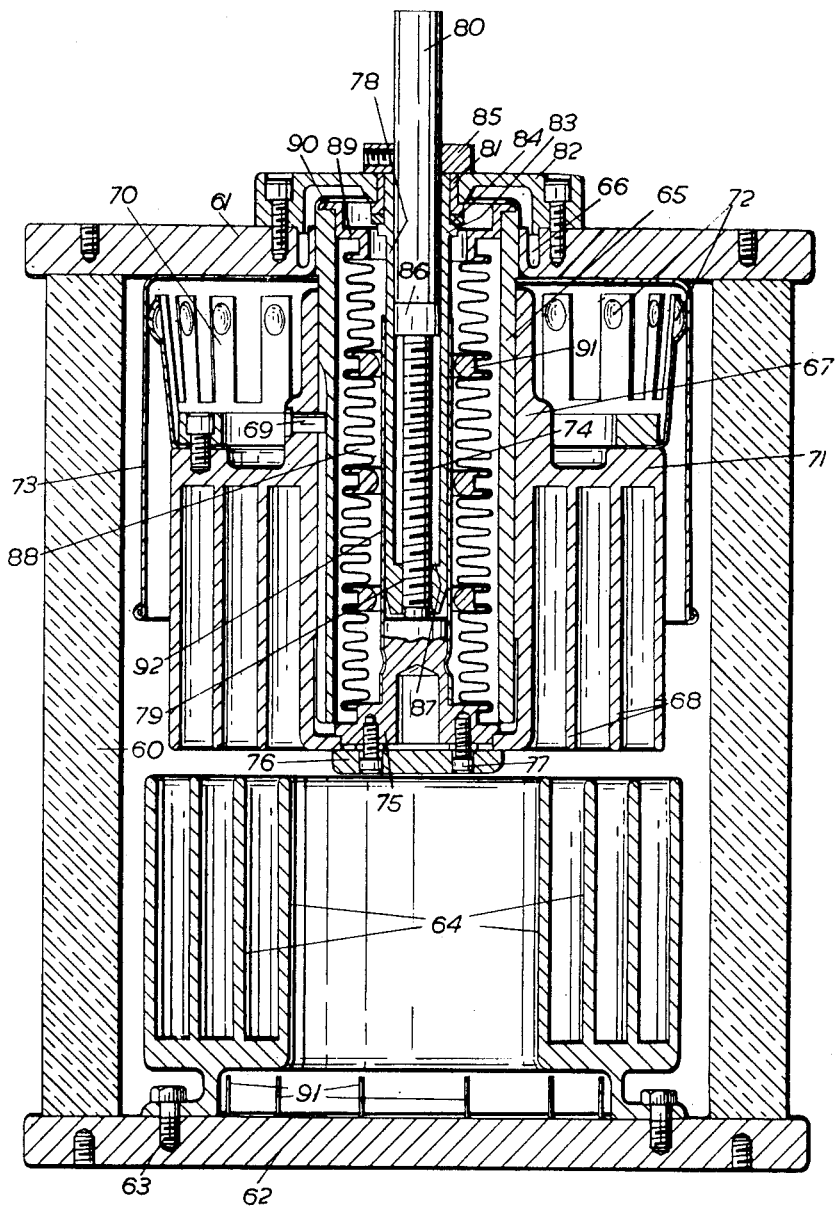

The invention may be carried into practice in various ways but two forms of condenser according to the invention will now be described with reference to the accompanying drawings in which Figure 1 is a sectional view of a condenser including both disc-type and cylindrical condenser plates, suitable for example for use in apparatus for so-called induction heating, as part of a production process for heat treating materials and articles, Figure 2 is a similar view to Figure 1 with the cylindrical plates in the "closed" position, Figure 3 is a sectional view with the plates in the "open" position of a condenser including only cylindrical condenser plates, and suitable for use in apparatus for high frequency radio transmission, and Figure 4 is a similar view to Figure 3 with the plates in the "closed" position.

The condenser shown in Figures 1 and 2 comprises a generally cylindrical casing having a cylindrical circumferential wall 1 of metal, one end of which is closed by a relatively thick metal end wall 2 to which it is joined in a gas tight manner by means of an annular closure member 3 of generally U-shaped cross section which is united to an integral flange 2a on the upper surface of the end wall 2, and to a flange ring 4 secured as by brazing to the upper edge of the cylindrical wall 1. The end wall 2 is bolted to the flange ring 4. The other end of the casing is closed by a somewhat domed metal end 5 which may be connected by brazing to the circumferential wall 1.

Rigidly supported from the centre of the relatively thick end wall 2 and projecting axially into the casing is a tubular supporting member 6 having an open inner end terminating at a point 7 within the casing, for example at a point spaced from the relatively thick end wall 2 by about three-fifths of the distance between the centres of the two end walls 2 and 5.

Also projecting axially from the relatively thick end wall 2 at evenly spaced points on a circle having the centre of the wall for centre are three pillars supporting a set of spaced disc-like condenser plates 8 (hereinafter for convenience called the non-insulated disc-like plates), each pillar comprising for example a stud or bolt 9 engaging a screw threaded bore provided in a boss 10 on the inner surface of the end wall 2 and passing with a close fit through holes in the plates 8 and surrounded by tubular distance pieces 11 which serve to space the plates both from the end wall and from each other. The tubular distance pieces 12 between the end wall 2 and the adjacent non-insulated plate 8 are relatively long so that the set of plates as a whole is spaced by an appreciable distance from the end wall 2.

Also supported from the relatively thick end wall 2 but in a manner insulating them from that end wall is a second set of disc-like plates 13, hereinafter for convenience called the insulated disc-like plates, which lie between the non-insulated disc-like plates 8 in the usual manner.

The insulated disc-like plates 13 are also supported on three pillars having their axes on a circle with its centre at the centre of the relatively thick end plate 2, these pillars being interposed between the pillars supporting the non-insulated disc-like plates 8. Each of the pillars carrying the insulated disc-like plates 13 is of a built up form including tubular insulating members and comprises a tubular socket member 14 carried in a gas tight manner in an aperture in the end wall 2 and provided at its inner and outer ends with seating parts for the ends of tubular insulating members 15 and 16 formed for example of used silica such as that sold under the name Vitreosil. The insulating tube 15 which engages the inner end of the socket 14 and thus projects into the casing, is relatively short while the insulating tube 16 engaging the outer end of the socket 14 and projecting outwards is longer. Moreover, while the insulating tube 14 does not make a fluid tight seal with the socket 14 the tube 16 makes a fluid tight seal both with the socket 14 and with a metal outer end cap 17 which closes its outer end. For this purpose the insulating tube 16 may be united to the socket 14 and the end cap 17 by means of a sealing compound of the kind which is cured at a relatively elevated temperature, for example the compound known as Araldite No. 1. Moreover, in such an arrangement the parts of the socket 14 and the end cap 17 which surround the ends of the insulating tube 16 and are united thereto by the sealing compound may be comprised by relatively thin walls formed so that they can be stretched somewhat beyond their elastic limit without damage and of such dimensions and material that when so stretched by thermal expansion or contraction they will not impose on the insulating tube 16 forces liable to damage it. To this end a thin brass ring 18 of generally U-shaped cross section may be attached at one edge portion to the socket 14 while its other edge portion surrounds and is united to the insulating tube 16 by the Araldite. The end cap 17 is provided with relatively thin side walls 19 which are similarly united to the insulating tube 16 by means of Araldite.

The short inner insulating tube 15 is also provided with an end cap 20, and a metal conducting tube 21 extends between the end caps 17 and 20 of the two insulating tubes and is provided with a screwthreaded part at one or each end to receive a bolt or nut by which the conducting tube is placed in tension and serves to draw the end caps towards one another and thus clamp into a rigid structure the assembly comprising the end caps 17 and 20, the insulating tubes 15 and 16 and the socket 14. For example the conducting tube 21 may be provided with a bolt 22 at its outer end engaging a screwthreaded part 23 which bears against the outer end cap 17 and has at its inner end an internally screwthreaded socket 24 which is engaged by a short bolt 25 the head of which bears on the face of the inner end cap 20 remote from the conducting tube 21. The end caps 20 are formed with apertures 26 providing communication between the interior of the casing and the spaces enclosed by the tubes 15 and 16.

Each of these bolts 25 is provided in its head with a screwthreaded bore engaged by the end of a plate-supporting bolt 27 the three plate-supporting bolts passing through and serving as a support for the insulated disc-like plates 13, to which end each bolt 27 is surrounded by spacing members 28 which space such plates from one another and from the adjacent end cap 20.

The lengths of the insulating tubes 15 and 16 are designed to be sufficient to prevent "flash-over," "surface tracking," or other breakdown of the electrical insulation under the conditions existing within the casing or in the surrounding atmosphere respectively, while the clearance between the socket member 14 and the conducting tube 21 need be only sufficient to prevent "flash over" under the conditions existing within the casing.

The end caps 17 of the longer insulating tubes 16 are connected, through the members 23 and thin metal bellows type diaphragms 38 to a hollow annular conducting member 39. Thus, this conducting member 39 constitutes one of the terminal points by which the condenser can be connected into its circuit and the casing forms the other. It will be appreciated that the metal bellows 38, being of thin section metal will be well suited to the conduction of high frequency currents, which are generally concentrated in the skin portions of members carrying them.

The insulated plate 13 most remote from the end wall 2 lies beyond the corresponding non-insulated disc-like plate 8 and is formed with a large diameter boss 29 to which is rigidly secured a disc-like part 30 from the face of which remote from the disc-like plates 8 and 13 projects a series of concentric cylindrical condenser plates 31, coaxial with the disc-like plates 8 and 13, and hereinafter called the fixed cylindrical plates.

Mounted to slide within the tubular supporting member 6 referred to above as supported from the centre of the thicker end wall 2 is a plate-carrying member 32 having an external flange 33 on the part thereof which projects beyond the open end 7 of the tubular guide member, to which flange 33 is secured a disc-like part 34 lying beyond the ends of the fixed cylindrical "plates" 31 and having formed on the face thereof adjacent to such fixed cylindrical plates a set of concentric cylindrical plates 35, hereinafter called the movable cylindrical plates, arranged so that they can enter the annular spaces between the fixed cylindrical plates 31, while remaining in spaced relationship to these fixed plates.

It will be seen that the degree of overlap between the fixed and movable cylindrical plates 31 and 35 can be varied by moving the plate-carrying member 32 for the movable plates in its tubular supporting member 6.

A series of ball like contact members 36 each mounted on a leaf spring 37 connected to the plate-carrying member 32 for the movable cylindrical plates 35 makes sliding contact in a manner known per se with the exterior of the tubular guide 6 so that the movable cylindrical plates 35 are maintained in electrical continuity with the thicker end wall 2 of the casing and the non-insulated disc-like plates 8.

An operating rod 40 passes through a guide socket 50 including a tubular member 41 mounted in an aperture in the centre of the domed end wall 5 and making a gas tight joint therewith, the inner end of the operating rod 40 being secured to a tubular part 42 which at its other end is secured to a flanged plug 43. A disc 44 rigidly fixed to the inner end of the tubular support 32 for the moveable cylindrical plates is secured to the plug 43 by means of a bolt 45 and the plate-carrying member 32 is thus rigidly connected to the operating rod 40. A metallic bellows type sealing member 46 extends between the flange on the plug 43 and a corresponding flange on the tubular part 41, the two ends of the bellows being united as by soldering, brazing or other means to the two flanges in a gas tight manner. For convenience in Figure 1 the bellows 46 is indicated by a single line only. Thus the bellows forms an impervious flexible wall preventing the escape of gas from the casing around the operating rod 40 while permitting the latter to move axially to vary the capacity of the condenser. Preferably the bellows comprises two or more separate lengths of circumferentially corrugated metal of the usual type united end to end by annular discs or guide members 47 which engage freely but closely the tube 42 and the operating rod 40, thus enabling a bellows of great overall length to be used while tending to prevent the bellows as a whole distorting in a manner which might cause the inner edges of its corrugations to make contact with the tube 42 or the operating rod 40.

The outer end of the operating rod 40 is provided with a screwthreaded portion 48 cooperating with an internally screwthreaded sleeve 49. An external thrust flange 51 on this sleeve 49 is located between a shoulder on the tubular member 41 and a corresponding shoulder on an end plate 52 secured to the guide socket 50 by means of bolts. The operating rod is provided with splines or keys, engaging corresponding keyways in the tubular member 41 (to prevent rotation of the rod), and it will be seen that by rotating the sleeve 49 in the appropriate direction the operating rod is caused to move inwards or outwards thereby varying the degree of overlap between the cylindrical condenser plates 31 and 35, and thus altering the capacity of the condenser.

The complete casing and the spaces enclosed by the insulating tubes 15 and 16, which are in communication with the interior of the casing through the apertures 26, are filled with sulphur hexafluoride at a pressure of say between 30 and 40 lbs. per square inch and it will be seen that since the casing is completely sealed without any escape path for such gas owing to the positive seal for the operating rod 40 provided by the bellows type seal 46, the casing can be sealed and will not subsequently require testing for gas pressure or replenishment of the gas from time to time. Moreover, since the insulating tubes 15 and 16, through which the insulated plates 13 of the condenser are connected to the annular conducting member 39 outside the casing, are filled with the gas under pressure the spacing of the tubular conducting members 21 within these insulating tubes from the metal socket members 14 where the tubular conducting members pass through the wall 2 of the casing need only be that required under the conditions existing within the casing.

Furthermore it will be seen that the construction provides a relatively lengthy bearing surface between the tubular supporting member 6 and the plate carrying member 32, which thus support the movable cylindrical plates in accurate relationship to the fixed cylindrical plates thereby permitting accurate adjusting of the capacity of the condenser within fine limits. The arrangement of the bellows type sealing member almost totally enclosed within the tubular supporting member 6 and the plate carrying member 32, and the provision of the guide members 47, makes possible the use of a relatively long bellows and thus tends to reduce the possibility of failure of the bellows owing to fatigue, while yet ensuring that the bellows does not distort laterally appreciably when the operating rod is moved. Moreover the bellows does not itself comprise the main current carrying member for the movable condenser plates.

It will be appreciated that the above construction is suitable for cases where a condenser is required having a large capacity in relation to the variation in capacity which is necessary for its purpose. In other cases where a large variation in capacity in relation to the maximum capacity is desired the casing which encloses the condenser plates in a gas tight manner may comprise a cylindrical casing having end walls which are electrically insulated from one another and respectively electrically continuous with the fixed and movable plates of the condenser and the following is a description by way of example of a form of condenser according to the invention embodying this arrangement.

The condenser shown in Figures 3 and 4 which may be suitable for use in apparatus for high frequency radio transmission, comprises a substantially cylindrical casing having a circumferential wall 60 formed of insulating material, for example of fused silica such as that sold under the name "Vitreosil," and conducting end walls 61, 62 formed of low expansion steels such as "Invar," which are connected in a gas tight manner respectively to the two ends of the circumferential wall and themselves comprise the terminal points by which the condenser may be connected into its circuit. In a preferred arrangement this connection between the end walls 61, 62, and the insulating wall 60 is made through the medium of a sealing compound of the heat cured type such as that known as Araldite No. 1 mentioned above.

The construction provides a relatively strong and rigid connection between the two end walls 61, 62, necessary for accurate positioning of the condenser plates which are attached thereto, and is furthermore well suited to production in quantity.

Secured to the end wall 62 by means of bolts 63 is a set of fixed concentric cylindrical plates 64 formed as unitary part and machined from a solid member which may for example be of aluminium. The base flange of the unit and the part adjacent thereto is slotted as shown at 91 for the purpose of permitting slight distortion of the aluminium unit relative to the Invar end wall 62 during heat treatment of the Araldite compound.

The opposite end wall 61 is formed with a central aperture in which is mounted a tubular supporting member 65 of mild steel for example, projecting inwards into the casing, the member 65 being united as by brazing to the adjacent edge portions of the end wall 61, which is formed with an annular groove 66 in order to provide the required degree of elasticity for the thermal expansion and contraction which occurs during the brazing operation, and during the heat treatment of the Araldite compound.

Outside the tubular supporting member 65 is arranged to slide a sleeve-like plate-carrying member 67, which may be of aluminium for example, and is formed integral with a set of movable concentric cylindrical condenser plates 68, the unit so formed being preferably machined from the solid. An inner extension of the plate-carrying member 67 itself constitutes the innermost of the movable cylindrical plates, and the diameters of the movable plates are such that they are capable of lying within the annular spaces between the fixed plates 64. A screw 69 projecting into the bore of the plate-carrying member 67 engages with a key-way in the tubular supporting member 65 and prevents the plate-carrying member from rotating relative thereto. Electrical contact between the movable plates 68 and the end wall 61 is provided by means of a slightly tapered split skirt 70, bolted to a flange 71 on the plate carrying member 67 and provided with sliding ball contact elements 72 which engage with a cylindrical contact member 73 secured to the end wall 61.

The operating mechanism for moving the movable plates 68 comprises a screw threaded operating rod 74 rigidly fixed to an end plug 75 which is clamped to a flange on the inner end of the plate-carying member 65 by means of a plate 76 and bolts 77. A tubular rotary member 78 surrounds the rod 74, and is provided with a screw threaded portion 79 at its inner end engaging the screw thread on the rod, while its outer end is rigidly connected to an external control shaft 80, and passes through a bush 81 mounted in an end plate 82 bolted to the casing end wall 61. The tubular member is provided with a flange 83 which bears against a washer 84 on the inner face of the bush 81, and a collar 85 is secured to the shaft 80 and bears on the outer side of the bush, thereby holding the shaft 80 and tubular member 78 against axial movement.

Accordingly when the control shaft 80 is rotated the screw threaded portion 79 on the tubular member 78 causes the operating rod 74 to move axially, thus moving the plate carrying member 67 and the movable plates 68, so as to vary the overlap between the plates and thus alter the capacity of the condenser. A head portion 86 on the outer end of the operating rod 74 engages shoulders 87 on the inner end of the tubular member 78 and so limits the inward movement of the plates 68 into the annular spaces between the fixed plates 64.

A corrugated copper bellows 88 makes a gas-tight joint between the plate-carrying member 67 and the end wall 61 of the casing, one end of the bellows being secured as by brazing to a flange on the plug 75, while the other end is united to a collar 89, which is itself fixed to the end of the tubular supporting member 65, the rim of the supporting member being swaged over a flange 90 formed on the outer end of the collar. The bellows 88 is conveniently formed in a number of sections, each united to guide collars 91 which bear against the external surface of the tubular member 78, or against a thin tubular sleeve 92 which is secured to the end plug 75 and which slides over the tubular member 78 as the plate carrying member is adjusted.

The bellows 88 is thus in this construction totally enclosed within the tubular supporting member 65 and the plate-carrying member 67, and it will be seen that the construction facilitates the use of a relatively long bellows, which is thus less likely to fail due to fatigue, and which is moreover protected from excessive lateral distortion by the guide collars 91.

The casing is filled preferably with sulphur hexafluoride gas at at pressure of say between 30 and 40 lbs. per square inch.

It is to be understood that the two constructions more particularly described above are given by way of example only and that the form and arrangement of the parts may vary widely according to the capacity of the condenser, the degree of variation of that capacity which is required, the pressure at which the gas is to be maintained therein, the maximum voltage and frequency with which it is to deal and other considerations.

In each case the cylindrical form of the fixed and movable cylindrical plates provides a rigid spacing of the plates and enables the fixed and movable plates to be exactly spaced relatively to one another.

What we claim as our invention and desire to secure by Letters Patent is:

1. A variable capacity electrical condenser of the gas-filled type, comprising a gas-tight casing, a set of fixed condenser plates in the form of a series of concentric cylinders mounted within said casing, a fixed cylindrical tubular supporting member rigidly secured to one wall of said casing and coaxially positioned with respect to said fixed plates, a cylindrical plate-carrying member slidably mounted on said tubular member for axial movement therealong, a set of movable condenser plates also in the form of a series of concentric cylinders coaxially secured to the plate-carrying member at a point in its length spaced from the end adjacent said fixed plates, with said plate-carrying member extending into the innermost of the cylinders carried thereon, said cylinders being of such diameter as to be capable of entering into the annular spaces between and overlapping the fixed plates, axial movement of said plate carrying member and the condenser plates thereon along said tubular member varying the overlap between said fixed and movable plates and thus varying the capacity of the condenser, operating mechanism extending from outside the casing and including an axially movable operating member extending into the innermost of the cylinders forming the set of movable plates and connected to said plate-carrying member, and a bellows-type sealing member extending into said innermost movable cylinder and surrounding the operating member with its ends connected in a gas-tight manner to said set of movable plates and to the casing respectively.

2. A variable capacity electrical condenser as claimed in claim 1 including a series of disc-type condenser plates of fixed capacity transversely positioned with respect to and electrically in parallel with the cylindrical plates and mounted coaxially thereof within the same casing, said disc-type series being formed with a central channel into which said tubular supporting member, plate-carrying member and operating member project.

3. A variable capacity electrical condenser of the gas filled type, comprising a gas-tight casing having a cylindrical side wall of insulating material, an end wall of conducting material secured in a gas-tight manner to one end of said cylindrical side wall, a set of fixed condenser plates in the form of a series of concentric cylinders mounted within said casing and mounted on said end wall, a second end wall of conducting material secured in a gas-tight manner to the other end of the cylindrical side wall, a fixed tubular supporting member rigidly secured to the second end wall and extending into said casing and coaxially positioned with respect to said fixed plates, a cylindrical plate-carrying member slidably mounted on said tubular member for axial movement therealong, a set of movable condenser plates also in the form of a series of concentric cylinders coaxially secured to said plate-carrying member at a point in its length spaced from the end adjacent the fixed plates, with said plate-carrying member extending into the innermost of the cylinders carried thereon, said cylinders being of such diameter as to be capable of entering into the annular spaces between and overlapping the fixed plates, axial movement of said plate-carrying member and the condenser plates thereon along said tubular member varying the overlap between said fixed and movable plates and thus varying the capacity of the condenser, operating mechanism extending from outside the casing through an aperture in the second end wall into the tubular supporting member and including an axially movable operating member extending into the innermost of the cylinders forming the set of movable plates and connected to said plate-carrying member, and a bellows type sealing member lying within said tubular supporting member and surrounding the operating member with its ends connected in a gas-tight manner to the set of movable plates and to the casing respectively.

4. A variable capacity electrical condenser as claimed in claim 3, in which the plate-carrying member is of tubular form and surrounds the fixed tubular supporting member.

5. A variable capacity electrical condenser of the gas-filled type, comprising a gas-tight casing of conducting material, a set of fixed condenser plates in the form of a series of concentric cylinders lying within the casing, at least one supporting assembly by which the fixed condenser plates are mounted within the casing, each assembly comprising a conducting pillar secured to the fixed plates and passing freely through an aperture in an adjacent wall of the casing, a tubular insulating member surrounding at least the portion of the pillar which extends outside the casing, and spaced from said pillar, the inner end of the tubular insulating member being sealed to the adjacent part of the casing by a gas-tight joint, a gas-tight end cap closing the outer end of the tubular insulating member, the outer end of the conducting pillar being secured to said end cap, which thus constitutes an external terminal for the condenser, a set of movable condenser plates also in the form of a series of concentric cylinders coaxial with the fixed plates and of such diameters as to be capable of lying in the annular spaces between the fixed plates, a fixed cylindrical tubular supporting member rigidly secured to the wall of the casing, a cylindrical plate-carrying member carrying the movable plates and supported by the tubular supporting member in a manner permitting it to move axially thereon, to vary the overlap between the fixed and movable concentric plates and thus vary the capacity of the condenser, operating mechanism extending from outside the casing into the tubular supporting member and including an axially movable operating member extending freely into the cylindrical space enclosed by the innermost of the set of movable plates and connected to the plate-carrying member and a bellows-type sealing member lying within the tubular supporting member and at least partly within the cylindrical space enclosed by the innermost of the set of movable plates and surrounding the operating member with its ends connected in a gas-tight manner respectively to the plate-carrying member and to the casing.

6. A variable capacity electrical condenser as claimed in claim 5, in which each supporting assembly for the fixed condenser plates includes a relatively short tubular insulating member surrounding a part of the conducting pillar which lies within the casing, and an abutment secured to the conducting pillar and against which one end of the relatively short tubular insulating member is arranged to bear, the other end of the tubular insulating member bearing against the casing itself, so as to clamp the supporting assembly rigidly to the adjacent part of the casing, while the interior of the chamber enclosed by the two tubular insulating members is in open communication with the interior of the casing.

7. A variable capacity electrical condenser as claimed in claim 6, including a set of disc-type condenser plates of fixed electrical capacity, arranged electrically in parallel with the cylindrical type plates, and comprising two series of disc-type plates, lying between the fixed cylindrical plates and the adjacent wall of the casing, with the plates in one series interposed between those of the other series, one series being connected to and supported by the conducting pillars for the fixed cylindrical plates, while the other series is supported directly from the casing.

References Cited in the file of this patent

UNITED STATES PATENTS

| | | |
|---|---|---|
| 1,625,330 | Pinkus | Apr. 19, 1927 |
| 2,091,855 | Hunerkopf | Aug. 31, 1937 |
| 2,192,062 | Hansell | Feb. 27, 1940 |
| 2,204,166 | Usselman | June 11, 1940 |
| 2,511,338 | Jennings | June 13, 1950 |
| 2,575,726 | Peck | Nov. 20, 1951 |

FOREIGN PATENTS

| | | |
|---|---|---|
| 411,033 | Italy | June 19, 1945 |
| 589,728 | Great Britain | June 27, 1949 |